(12) United States Patent
Behairy et al.

(10) Patent No.: US 8,417,237 B2
(45) Date of Patent: Apr. 9, 2013

(54) SELECTIVE CONTROL OF A WIRELESS SERVICE ASSOCIATED WITH A MOBILE DEVICE

(75) Inventors: Hatim M Behairy, Riyadh (SA); Sami M. Al-Humaidi, Riyadh (SA); Waleed S. Alrobian, Riyadh (SA); Adnan Al Ghammas, Riyadh (SA); Ibrahem Al Mansour, Riyadh (SA); Abdullah S. Dabail, Riyadh (SA); Mishal Al Khalifa, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 205 days.

(21) Appl. No.: 13/053,288

(22) Filed: Mar. 22, 2011

(65) Prior Publication Data

US 2012/0244860 A1    Sep. 27, 2012

(51) Int. Cl.
*H04W 4/00* (2009.01)

(52) U.S. Cl. .................. 455/422.1; 455/414.1; 455/436; 455/437; 455/438; 455/456.1; 455/561; 455/562.1; 370/328; 370/329; 370/330; 370/331; 370/332; 370/333

(58) Field of Classification Search .............. 455/414.1, 455/422.1, 434, 436–444, 456.1, 561, 562.1; 370/328, 329, 330, 331, 332, 333

See application file for complete search history.

(56) References Cited

U.S. PATENT DOCUMENTS

| 6,038,445 | A | * | 3/2000 | Alperovich et al. | 455/432.1 |
| 7,548,751 | B2 | * | 6/2009 | Katori et al. | 455/443 |
| 7,606,914 | B2 | * | 10/2009 | Ikeda et al. | 709/228 |
| 8,009,675 | B2 | * | 8/2011 | Andersson | 370/395.21 |
| 8,040,864 | B2 | * | 10/2011 | Karaoguz et al. | 370/338 |
| 2007/0155421 | A1 | * | 7/2007 | Alberth et al. | 455/553.1 |

* cited by examiner

*Primary Examiner* — Olumide T Ajibade Akonai
(74) *Attorney, Agent, or Firm* — Raj Abhyanker, P.C.

(57) ABSTRACT

A mobile communication system includes a network listener base station associated with a vehicle configured to scan an environment within the mobile communication system and a second base station associated with the vehicle. The second base station includes an antenna associated therewith to generate a signal that is stronger than a wireless signal of a cell site associated with a wireless service to a mobile device within the vehicle. The mobile communication system also includes a base station controller to identify the mobile device when the mobile device is within the controlled area, to determine that the mobile device is within the controlled area, and to gain control of an access of wireless communication associated with the mobile device when the mobile device is within the controlled area through the generation of the stronger signal of the second antenna.

20 Claims, 6 Drawing Sheets

| MOBILE DEVICE 302 | IDENTITY 304 | LOCATION 306 | VEHICLE 308 | ACCESS 310 |
|---|---|---|---|---|
| MOBILE DEVICE 120 | 82569 | CONTROLLED AREA 138 | VEHICLE 134 | GRANTED |
| MOBILE DEVICE 122 | 82754 | OUTSIDE CONTROLLED AREA | UNKNOWN | NOT GRANTED |
| MOBILE DEVICE 124 | UNKNOWN | CONTROLLED AREA 138 | UNKNOWN | NOT GRANTED |
| MOBILE DEVICE 126 | 81765 | CONTROLLED AREA 138 | CONVOY 136 | GRANTED |
| ... | ... | ... | ... | ... |

DATABASE 300

SELECTIVE CONTROL OF A WIRELESS SERVICE ASSOCIATED WITH A MOBILE DEVICE

FIELD OF TECHNOLOGY

This disclosure relates generally to mobile communication systems and more particularly, to a method, an apparatus and/or a system of selectively controlling a wireless service associated with a mobile device.

BACKGROUND

A use of a mobile phone may be restricted to a coverage area determined by a mobile network operator (MNO). However, a user of the mobile phone may have no control over how to limit, monitor and/or restrict a cellular signal within the coverage area. The aforementioned lack of control may inconvenience the user of the mobile phone and/or societal members during events within the coverage area that may require silence such as religious functions and movies. The user carrying the mobile phone may be driving a vehicle, during which he/she may wish not to be interrupted and distracted by, for example, a telephone call or a Short Message Service (SMS) message.

A mobile device jammer may be employed to restrict access to a mobile device (e.g., the mobile phone discussed above) through preventing the mobile device from receiving a cellular signal from a cell tower and/or transmitting the cellular signal to the cell tower. However, the use of the mobile device jammer may be illegal in certain jurisdictions. Moreover, signals generated by the mobile device jammer to restrict access to a mobile device may disrupt the functionality of other sensitive electronic equipment (e.g., a pacemaker). As a result, the use of the mobile device jammer may be harmful to individuals, and may not be feasible in certain geographic locations.

SUMMARY

Disclosed are a method, an apparatus and/or system of selectively controlling a wireless service associated with a mobile device.

In one aspect, a mobile communication system includes a network listener base station associated with a vehicle configured to scan an environment within the mobile communication system. The network listener base station includes a first antenna associated therewith. The mobile communication system also includes a second base station associated with the vehicle. The second base station has a second antenna associated therewith to generate a signal that is stronger than a wireless signal of a cell site associated with a wireless service to a mobile device within the vehicle. The generation of the stronger signal of the second antenna is controlled through the network listener base station, and the coverage area of the first antenna includes the controlled area associated with the second antenna.

Further, the mobile communication system includes a base station controller to identify the mobile device when the mobile device is within the controlled area based on an identification data associated therewith, to determine that the mobile device is within the controlled area based on the detection of the mobile device through the second antenna, and to gain control of an access of wireless communication associated with the mobile device based on the identification data when the mobile device is within the controlled area through the generation of the stronger signal of the second antenna.

In another aspect, a method includes identifying, through a base station controller, a mobile device in a vehicle when the mobile device is within a controlled area associated with an antenna of a base station associated with the base station controller based on an identification data of the mobile device, and determining that the mobile device is inside the controlled area based on a detection thereof through the antenna. The method also includes generating, through the antenna of the base station, a signal that is stronger than a wireless signal of a cell site associated with a wireless service to the mobile device. The generation of the stronger signal of the antenna of the base station is controlled through a network listener base station.

Further, the method includes gaining, through the base station controller, control of an access of wireless communication associated with the mobile device based on the identification data when the mobile device is within the controlled area. The control is gained through the generation of the stronger signal through the antenna of the base station.

In yet another aspect, a method includes storing a profile data associated with a mobile device within a vehicle in a memory associated with a base station controller, and identifying, through the base station controller, the mobile device when the mobile device is within a controlled area associated with an antenna of a base station associated with the base station controller based on the stored profile data. The method also includes determining that the mobile device is inside the controlled area based on a detection thereof through the antenna, and, generating, through the antenna of the base station, a signal that is stronger than a wireless signal of a cell site associated with a wireless service to the mobile device to enable the base station controller gain control of the wireless service to the mobile device when the mobile device is determined to be within the controlled area.

The generation of the stronger signal of the antenna of the base station is controlled through a network listener base station. Further, the method includes permitting or denying at least a portion of the wireless service to the mobile device through the base station controller upon the base station controller gaining control of the mobile device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description.

DETAILED DESCRIPTION

Disclosed are a method, an apparatus and/or a system of selectively controlling a wireless service associated with a mobile device. Although the present embodiments have been described with reference to specific example embodiments, it will be evident that various modifications and changes may be made to these embodiments without departing from the broader spirit and scope of the various embodiments.

Figure 1:
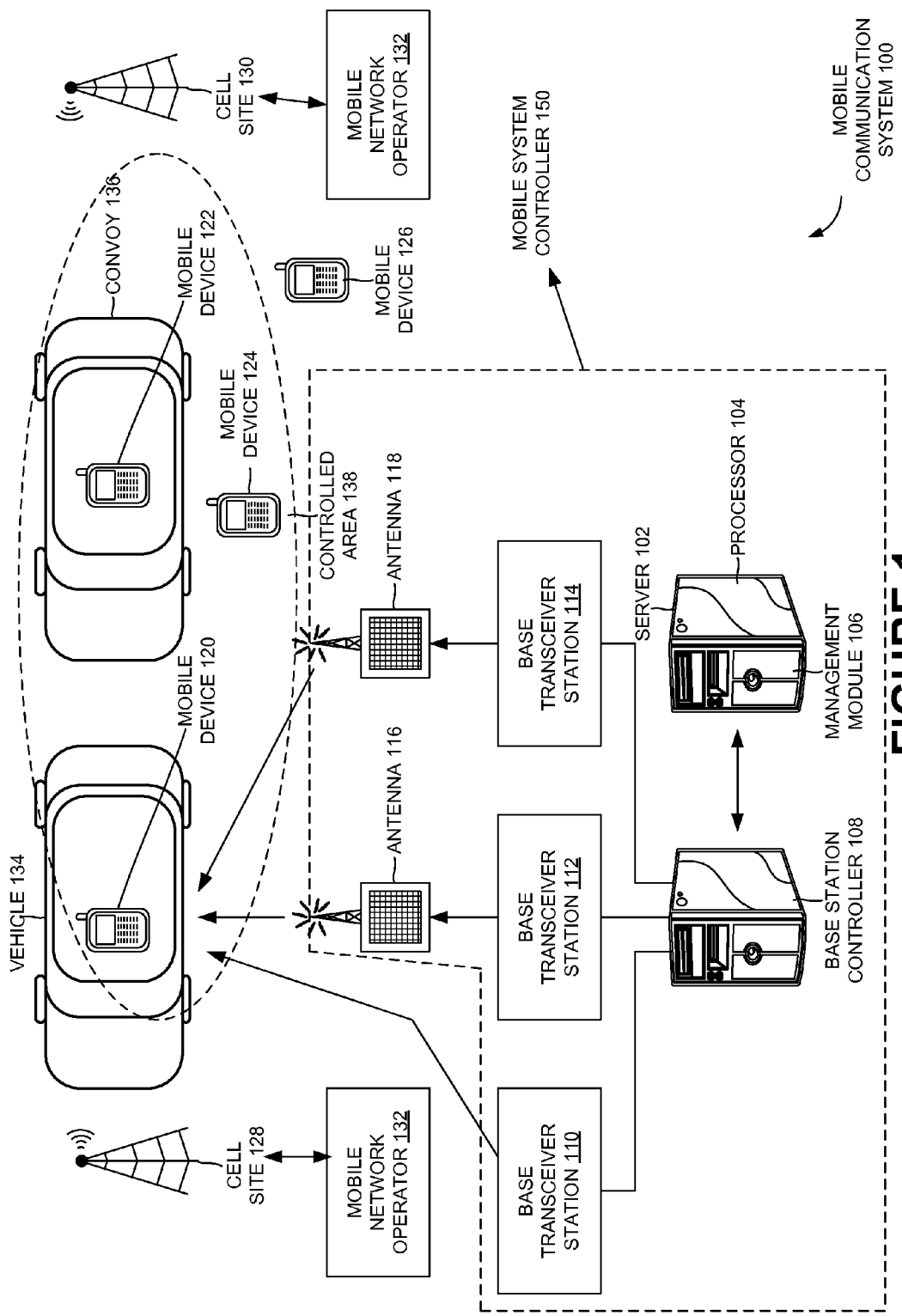
FIG. 1 is a schematic view of a mobile communication system, according to one or more embodiments.

FIG. 1 shows a mobile communication system 100, according to one or more embodiments. In one or more embodiments, a mobile system controller 150 of mobile communication system 100 may include the requisite control equipment for communication associated therewith. In one or more embodiments, mobile system controller 150 may include one or more Base Transceiver Stations (BTSs) (e.g., BTS 110, BTS 112, BTS 114) to facilitate wireless communication between a mobile device (e.g., mobile device 120) and the mobile network associated therewith. In one or more embodiments, the one or more BTSs may be wireless communications station(s) installed at fixed location(s) (e.g., within vehicle 134, as will be discussed below) and used to communicate as part of a wireless telephone system such as cellular Code Division Multiple Access (CDMA) and/or Global System for Mobile Communications (GSM™) cell site. A wireless telephone base station may communicate with a mobile or hand-held phone.

In one or more embodiments, the "intelligence" associated with BTS 110, BTS 112 and BTS 114 may be provided through a Base Station Controller (BSC) 108. In one or more embodiments, BSC 108 may handle allocation of radio channel(s) to mobile device 120 and/or receive measurements therefrom. In an example embodiment, a management module 106 of mobile system controller 150 may execute on a server 102 associated with BSC 108. In one or more embodiments, server 102 may be an application server, e-mail server, communications server, web server, file server, central management server, etc. In one or more embodiments, server 102 may communicate with a mobile network operator 132 based on a set of instructions configured to execute on a processor 104 thereon. In one example embodiment, the one or more BTSs (e.g., BTS 110, BTS 112, BTS 114) may wirelessly communicate with a remote server. In another example embodiment, server 102 may be the same as BSC 108 or processor 104 may be associated with BSC 108. In one or more embodiments, server 102 may include a memory (not shown) associated therewith.

In one example embodiment, the one or more BTSs may be coupled to the BSC 108 through a local area network (LAN) or a Transmission Control Protocol (TCP) connection. In one or more embodiments, each BTS may include one or more antennas associated therewith (e.g., antenna 116, antenna 118) having a coverage area associated therewith. In one or more embodiments, one antenna (e.g., antenna 116) may have a coverage area different from another antenna (e.g., antenna 118). The base station may be a femtocell or a picocell. In one or more embodiments, one or more of the BTSs (e.g., BTS 110) may be set up as a dedicated "network listener." For example, BTS 110 may select an appropriate Absolute Radio-Frequency Channel Number (ARFCN) to be utilized by mobile device 120.

In one or more embodiments, a user of mobile device 120 may be driving a vehicle 134. In one or more embodiments, as vehicle 134 is moving, the aforementioned one or more BTSs (e.g., BTS 110, BTS 112, BTS 114) may be placed inside vehicle 134. As shown in FIG. 1, in one or more embodiments, another moving vehicle (e.g., convoy 136) may serve to monitor vehicle 134. For example, vehicle 134 may include a Very Important Person (VIP), and convoy 136 may include a security guard thereof.

FIG. 1 shows controlled area 138, which may be the combined coverage area of antenna 116 and antenna 118. In one or more embodiments, BSC 108 (or, server 102) may determine an identity of mobile device 120 when mobile device 120 is within controlled area 138. In one or more embodiments, the location of mobile device 120 may be traced to controlled area 138 based on the detection thereof utilizing the one or more antennas. In one or more embodiments, the coverage area (not shown) of an antenna (not shown) associated with "network listener" BTS 110 may be greater than controlled area 138. In one or more embodiments, "network listener" BTS 110 may serve to monitor the BTS environment of a Mobile Network Operator (MNO) associated with providing wireless service(s) to mobile devices within the coverage area thereof. It is obvious that the coverage area of the antenna associated with "network listener" BTS 110 and controlled area 138 may be varying due to the movement of vehicle 134.

FIG. 1 shows a single "network listener" BTS 110. However, in one or more embodiments, there may be a pair of "network listener" BTSs (and one or more antennas associated therewith) to scan and analyze the MNO BTS environment. The pair of "network listener" BTSs is, again, controlled by BSC 108. In one or more embodiments, the "channel" selection operation through BSC 108 may be enabled through information received by the pair of "network listener" BTSs. In one or more embodiments, "network listener" BTS 110 may also be configured to enable the increase of signal levels of antenna 116 and/or antenna 118 associated with BTS 112 and BTS 114 respectively when mobile device 120 is within controlled area 138 such that BSC 108 may gain control of access to wireless service(s) (e.g., from MNO 132) associated with mobile device 120.

In one or more embodiments, thus, BSC 108 may permit control of an access of a wireless signal of mobile device 120 when mobile device 120 is traced to be within controlled area 138. In one or more embodiments, the aforementioned control permission may be based on the identity (e.g., based on the International Mobile Subscriber Identity (IMSI) number, based on the International Mobile Station Equipment Identity (IMEI) number) of mobile device 120.

FIG. 1 shows a cell site (e.g., cell site 128, cell site 130) configured to provide wireless service(s) to mobile device 120 when mobile device 120 is not inside controlled area 138. For example, a cell site may include one or more antenna(s) and electronic communications equipment placed on a radio mast or tower configured to control a cell in mobile communication system 100. Cell site 128 and/or cell site 130 may be coupled to MNO 132. As discussed above, MNO 132 may provide services for mobile phone subscribers associated with mobile communication system 100. In one or more embodiments, as vehicle 134 is moving, the signal associated with cell site 128 or cell site 130 may be stronger, depending on the location of vehicle 134.

In the example embodiment shown in FIG. 1, when a user of mobile device 120 is driving vehicle 134 and has entered controlled area 138, the signal generated through antenna 116 and/or antenna 118 may be stronger than the signal associated with MNO 132 (e.g., cell site 128, cell site 130). Therefore, mobile device 120 may be prevented from receiving the signal associated with MNO 132 (e.g., from cell site 128, cell site 130) and from transmitting a signal thereto through BSC 108.

In one or more embodiments, the location of mobile device 120 may be determined to be within controlled area 138 based on a detection of mobile device 120 through the one or more antenna(s). In one or more embodiments, upon detection of the location, mobile device 120 may be rendered controllable through BSC 108.

FIG. 1 shows mobile device 122, mobile device 124 and mobile device 126, in addition to mobile device 120. While mobile device 120 may be located in moving vehicle 134, mobile device 122 may be in convoy 136, mobile device 124 may be within controlled area 138 but is stationary and mobile device 126 may be stationary and outside controlled area 138. The aforementioned locations of the mobile devices represent scenarios in which the mobile devices may be controlled. It is obvious that mobile device 124, which is shown as being within controlled area 138 in FIG. 1, may be out of controlled area 138 with the subsequent movement of vehicle 134. Also, it is obvious that mobile device 126, which is shown as being outside controlled area 138 in FIG. 1, may be within controlled area 138 with the subsequent movement of vehicle 134.

In one or more embodiments, BSC 108 may permit control/management of mobile device 120 inside the moving vehicle 134 based on a whitelist, maintained at server 102. In one or more embodiments, the whitelist may be a list and/or a register of entries associated with the mobile device(s) that includes information associated with particular privilege(s), service(s), mobility, access and/or recognition(s) assigned thereto. In one example embodiment, alternately, the whitelist may be hardcoded into a virtual BTS (vBTS) executing on a single BTS platform associated with BSC 108. The hardcoding may be done to reduce decision overhead.

In one or more embodiments, users of mobile devices may subscribe to service(s) associated with the control of access to wireless signals (and, services) described above. In an example scenario, when vehicle 134 is moving, controlled area 138 may be associated with a hospital. In other words, at least a part of the hospital may be included within controlled area 138. In one or more embodiments, the whitelist maintained at server 102 (or, hardcoded into a vBTS) may include identification data associated with the subscribers of the service(s) described above. Thus, specific wireless service(s) to a subscriber (e.g., user of mobile device 120) may be permitted or denied, depending on preference and/or the location thereof.

In another scenario, the whitelist may include information associated with doctors and/or staff of the hospital. Thus, when a doctor/staff user of mobile device 120 is within controlled area 138, at least a part of the wireless service(s) associated therewith may still be enabled so that the user may be able to attend to emergency calls and/or messages. Wireless service(s) associated with all others may be disabled when within controlled area 138. In yet another scenario, the user of mobile device 120 may be a VIP present in the whitelist. Thus, wireless service(s) associated therewith may be enabled all the time, regardless of whether the VIP falls within a controlled area (e.g., controlled area 138) or not. Wireless service(s) associated with mobile device 122 (e.g., in convoy 136, serving as a security guard to the VIP associated with mobile device 120) may also be enabled all the time.

In another example embodiment, permission associated with delivery of an advertising message may be granted to mobile device 120 through BSC 108 when mobile device 120 is within controlled area 138. For example, delivery of the advertising message may be based on the location of mobile device 120 and/or demographic data associated with the user of mobile device 120. The demographic data, for example may be stored in server 102. The advertising message may be a Short Message Service (SMS) message or a Multimedia Message Service (MMS) message. In one or more embodiments, the demographic data of the user of mobile device 120 may be stored in correspondence with the identity of mobile device 120.

In one or more embodiments, as discussed above, BSC 108 may determine that mobile device 120 has entered controlled area 138 based on the detection thereof by antenna 116 and/or antenna 118. The "network" listener BTS 110 may be configured to enable an increased signal level of the appropriate antenna (e.g., antenna 116, antenna 118) whose coverage area includes mobile device 120 such that the signal level of the appropriate antenna is greater than the signal level associated with the cell site. In one or more embodiments, although controlled area 138 is associated with the coverage areas of both antenna 116 and antenna 118, the ability to suitably increase the signal level of the appropriate antenna alone may contribute to power savings. Mobile device 120 may be deemed to have moved outside controlled area 138 based on the failure of antenna 116 and antenna 118 to detect mobile device 120. It is obvious that more than two antennas may be utilized to detect the location of mobile device 120. Also, it is obvious that the detection may be done through merely one antenna, and that the number of BTSs may be varied.

Figure 2:
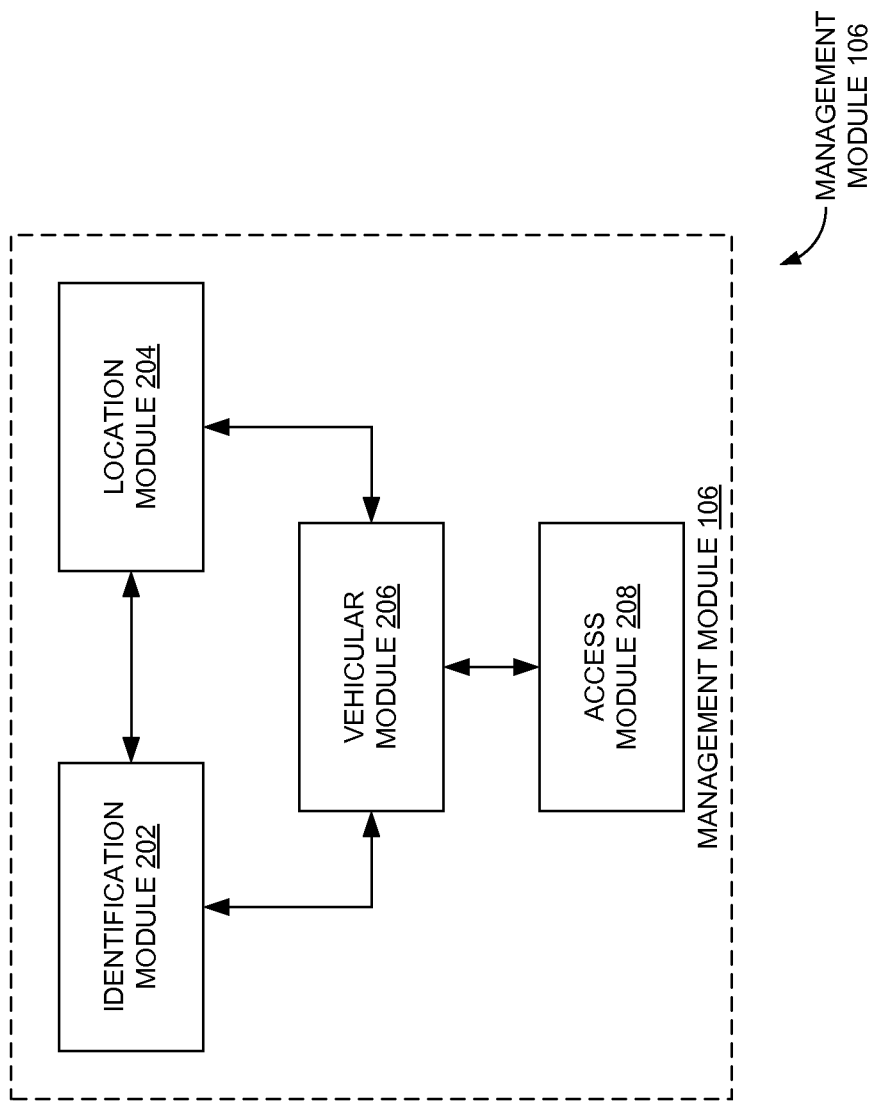
FIG. 2 is a schematic view of a management module associated with the mobile communication system of FIG. 1, according to one or more embodiments.

FIG. 2 shows a management module 106, according to one or more embodiments. In one or more embodiments, through identification module 202 of management module 106 associated with BSC 108, BSC 108 may determine the identity of mobile device 120 inside the moving vehicle 134 through the association of mobile device 120 with the signal of antenna 116 and/or antenna 118 of BTS 112 and BTS 114 respectively. In one or more embodiments, the identity of mobile device 120 may be based on the IMSI number or the IMEI number thereof. In one or more embodiments, management module 106 may include a location module 204 to determine the location of mobile device 120 based on the detection thereof through antenna 116 and/or antenna 118 that are coupled to the BTSs, as discussed above. In one or more embodiments, location module 204 may also determine the location of mobile device 120 and notify identification module 202 when the location of mobile device 120 is within controlled area 138.

In one or more embodiments, management module 106 may also include an access module 208 configured to enable access to the control of wireless signal(s) when mobile device 120 is within controlled area 138. In one or more embodiments, access module 208 may be configured to communicate with vehicular module 206, which, in one embodiment, may be mounted on vehicle 134 or associated with mobile device 120. In one or more embodiments, vehicular module 206 may include an antenna (not shown) configured to relay information to an appropriate BTS/BSC 108 associated with server 102. For example, once mobile device 120 is within controlled area 138, vehicular module 206 may relay location information and/or identification information to the appropriate BTS/BSC 108. Based on the identification information, access module 208 may enable access to the control of wireless signal(s) to mobile device 120 to mobile system controller 150 (or, BSC 108). It is to be noted that although wireless service(s) associated with all mobile devices detected through the appropriate antenna(s) may be restricted, MNO 132 involvement may cause the restriction to be based on location and identification thereof.

FIG. 2 shows vehicular module 206 as part of management module 106, which implies that vehicular module 206 may relay information to the appropriate BTS/BSC 108 associated with server 102. It is obvious that vehicular module 206 may merely reside as a set of instructions (e.g., software) in server 102, analogous to identification module 202, location module 204 and/or access module 208. In another example embodiment, vehicular module 206 may lie outside management module 106. In one or more embodiments, vehicular module 206 may communicate with identification module 202 and/or location module 204 to transfer information thereof.

In one or more embodiments, upon detection of mobile device 120 within controlled area 138, the appropriate BTS may be configured to broadcast a control signal (e.g., Broadcast Control Channel (BCCH) signal). As discussed above, the aforementioned control signal may be stronger than the wireless signal associated with cell site 128 and cell site 130. Mobile device 120 may, therefore, be configured to reselect the stronger signal instead of the wireless signal(s) from cell site 128 and cell site 130. Thus, in one or more embodiments, mobile system controller 150 may mimic a system including jammers to restrict access of mobile phone 120.

Figure 3:
FIG. 3 is a schematic view of a database of information associated with mobile devices stored at a server associated with the mobile communication system of FIG. 1, according to one or more embodiments.

FIG. 3 shows a database 300 of information associated with mobile devices stored at server 102, according to one or more embodiments. In one or more embodiments, database 300 may include fields such as mobile device 302 (e.g., mobile device 120, mobile device 122, mobile device 124, mobile device 126), identity 304 (e.g., identification information associated with the corresponding mobile device), location 306 (e.g., location information associated with the corresponding mobile device; shown as within controlled area 138, outside controlled area 138), vehicle 308 (e.g., vehicle 134, convoy 136, unknown), and access 310 information (e.g., granted, not granted). It is obvious that other fields may be included in database 300 and/or may substitute the fields shown in FIG. 3. For example, mobile device 120 may have unique identification information (e.g., 82569) associated therewith, which may be stored at server 102. As shown in FIG. 3, when mobile device 120 is within controlled area 138 by way of vehicle 134 being in controlled area 138, access to the wireless service associated with mobile device 120 may be granted to BSC 108.

In one or more embodiments, MNO 132 and/or third-parties may be provided access to database 300. To summarize, in one or more embodiments, mobile devices entering controlled area 138 may be interrogated through BSC 108 and the details thereof captured and stored at server 102. In one or more embodiments, the aforementioned details associated with all the mobile devices within controlled area 138 may be made available to MNO 132 and/or third parties. In one example embodiment, the wireless service associated with mobile device 120 inside the moving vehicle 134 may be disabled through MNO 132 when mobile device 120 is within controlled area 138. In another example embodiment, the wireless service associated with mobile device 120 inside the moving vehicle 134 may be rendered controllable through MNO 132 when mobile device 120 is within controlled area 138.

Figure 4:
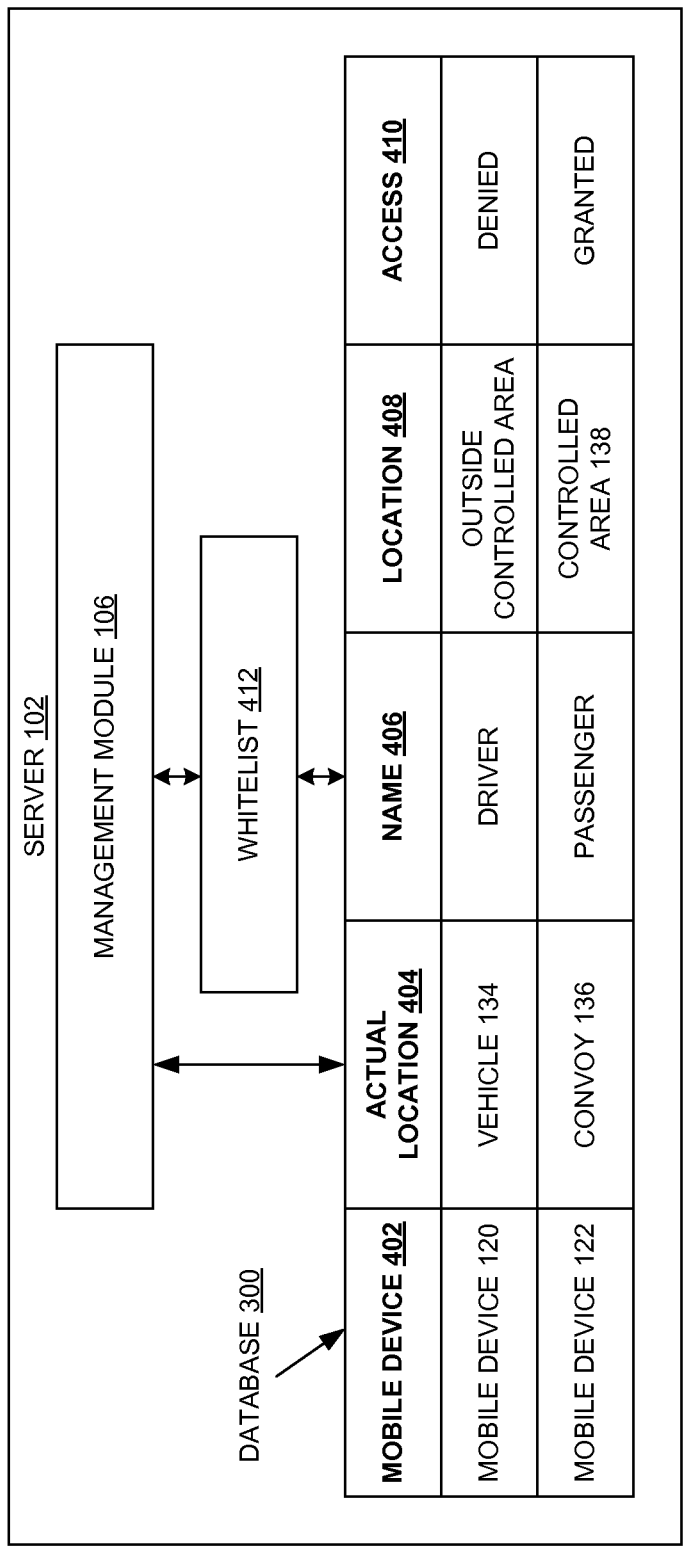
FIG. 4 is a schematic view of the server of FIGS. 1 and 3, according to one or more embodiments.

FIG. 4 shows server 102, according to one or more embodiments. In one or more embodiments, server 102 may include management module 106, as also shown in FIG. 1. In one or more embodiments, the whitelist (e.g., whitelist 412) discussed above may be stored on server 102 (or, hardcoded into a vBTS). In one or more embodiments, based on a presence/absence on the whitelist, mobile device 120, when within controlled area 138, may be permitted or denied access to wireless service(s) associated with MNO 132 through an appropriate BTS (and the antenna associated therewith) transmitting a signal stronger than the signal associated with the wireless service(s). In one or more embodiments, as shown in FIGS. 3-4, server 102 may have database 300 associated therewith, which includes information associated with the mobile devices stored therein.

FIG. 4 shows database 300 with fields such as mobile device 402 (e.g., mobile device 120, mobile device 122), actual location 404 (e.g., vehicle 134, convoy 136), type of user 406 (e.g., driver, passenger), location 408 (e.g., within controlled area 138, outside controlled area 138) and access 410 (e.g., granted, denied). Again, it is obvious that database 300 may be implemented in other ways, and that alternate implementations are within the scope of the exemplary embodiments discussed above.

Thus, exemplary embodiments discussed above enable control of access of wireless service(s) to mobile devices when the aforementioned mobile devices are within regions requiring social sensitivity (e.g., regions including prayer halls, religious places of worship, cinema halls, hospitals). Although, FIG. 1 shows mobile device 120 within the moving vehicle 134, the concepts involved herein also apply to scenarios where vehicle 134 comes to a halt.

Figure 5:
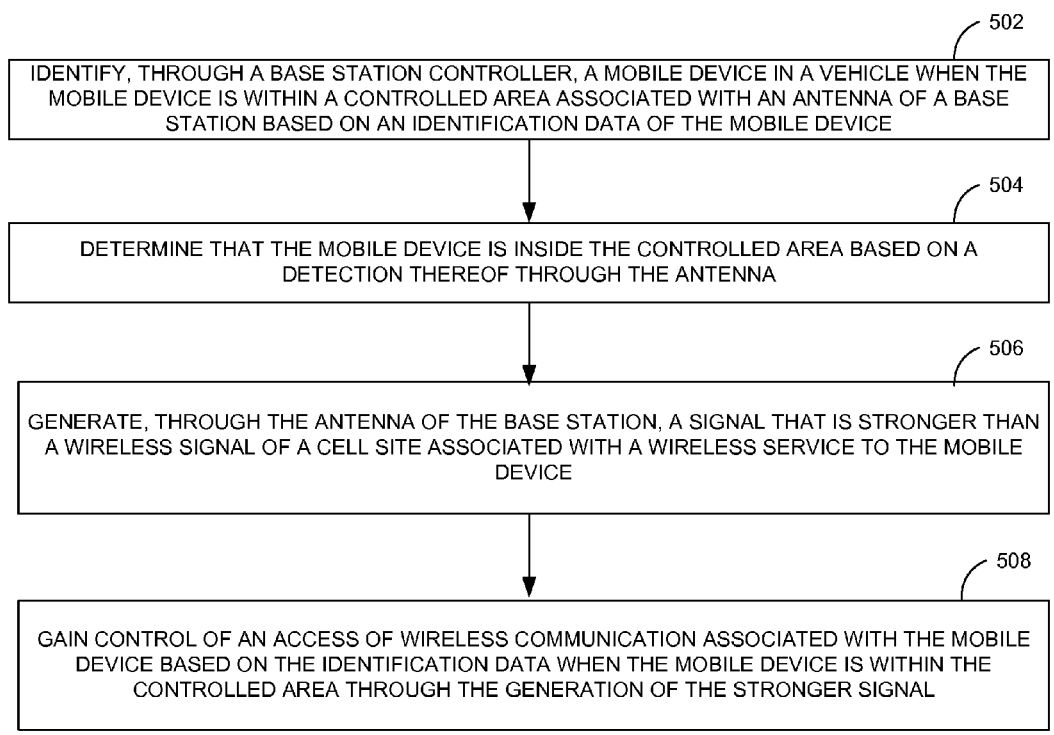
FIG. 5 is a process flow diagram detailing the operations involved in a method of gaining control of an access of a wireless service to a mobile device within a vehicle, according to one or more embodiments.

FIG. 5 shows a process flow diagram detailing the operations involved in a method of gaining control of an access of a wireless service to a mobile device 120 within a vehicle (e.g., vehicle 134), according to one or more embodiments. In one or more embodiments, operation 502 may involve identifying, through a BSC 108, mobile device 120 within the vehicle when mobile device 120 is within a controlled area 138 associated with an antenna (e.g., antenna 116, antenna 118) of a base station (e.g., BTS 112, BTS 114) associated with BSC 108 based on an identification data of mobile device 120. In one or more embodiments, the base station may be located in vehicle 134. In one or more embodiments, operation 504 may involve determining that mobile device 120 is inside controlled area 138 based on a detection thereof through the antenna.

In one or more embodiments, operation 506 may then involve generating, through the antenna of the base station, a signal that is stronger than a wireless signal of a cell site associated with a wireless service to mobile device 120 when mobile device 120 is determined to be within controlled area 138. In one or more embodiments, the generation of the stronger signal of the antenna of the base station may be controlled through a network listener base station (e.g., BTS 110) on vehicle 134. In one or more embodiments, operation 508 may then involve gaining, through BSC 108, control of an access of wireless communication associated with mobile device 120 based on the identification data when mobile device 120 is within controlled area 138. In one or more embodiments, the control may be gained through the generation of the stronger signal through the antenna of the base station.

Figure 6:
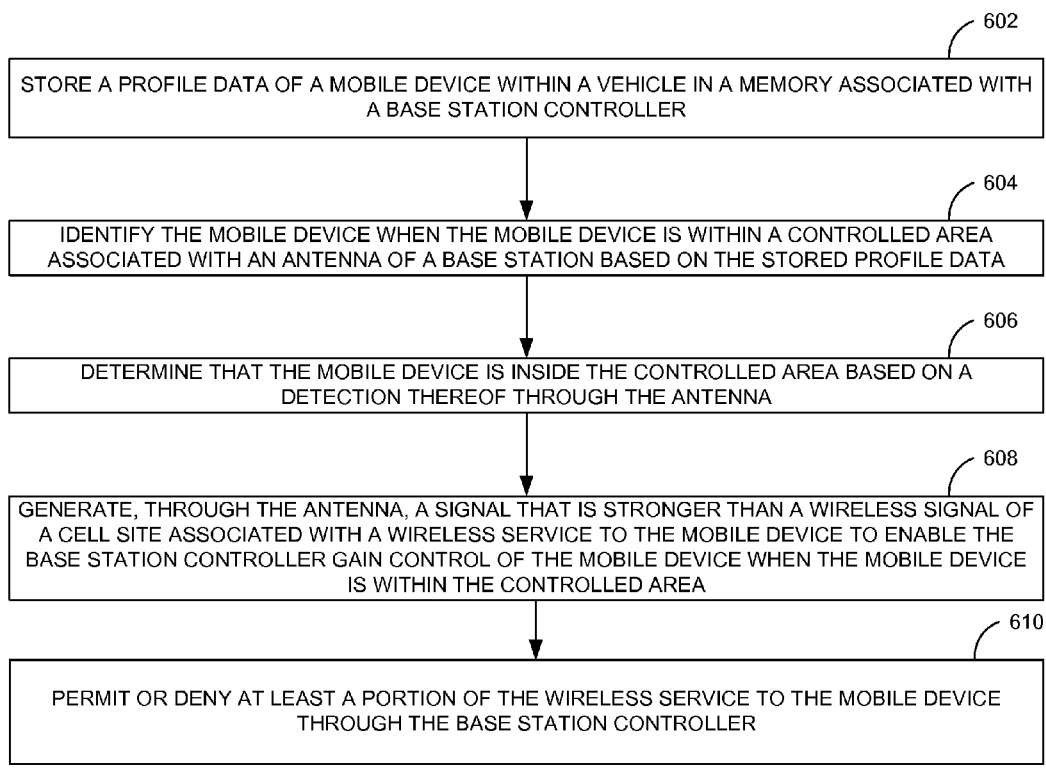
FIG. 6 is a process flow diagram detailing the operations involved in a method of permitting/denying access to a wireless service associated with a mobile device within a vehicle, according to one or more embodiments, according to one or more embodiments.

FIG. 6 shows a process flow detailing the operations involved in a method of permitting/denying access to a wireless service associated with a mobile device 120 within a vehicle (e.g., vehicle 134), according to one or more embodiments. In one or more embodiments, operation 602 may involve storing a profile data of mobile device 120 in a memory associated with BSC 108. In one or more embodiments, operation 604 may involve identifying, through BSC 108, mobile device 120 when mobile device 120 is within a controlled area 138 associated with an antenna (e.g., antenna 116, antenna 118) of a base station (e.g., BTS 112, BTS 114) associated with BSC 108 based on the stored profile data. In one or more embodiments, the base station may be on vehicle 134. In one or more embodiments, operation 606 may involve determining that mobile device 120 is inside controlled area 138 based on a detection thereof through the antenna.

In one or more embodiments, operation 608 may involve, generating, through the antenna of the base station, a signal that is stronger than a wireless signal of a cell site associated with a wireless service to mobile device 120 when mobile device 120 is within controlled area 138 to enable BSC 108 gain control of mobile device 120. In one or more embodiments, the generation of the stronger signal of the antenna of the base station may be controlled through a network listener base station (e.g., BTS 110) on vehicle 134. In one or more embodiments, operation 610 may then involve permitting or denying at least a portion of the wireless service to mobile device 120 through BSC 108 upon BSC 108 gaining control of mobile device 120.

Although the present embodiments have been described with reference to specific example embodiments, it will be evident that various modifications may be made to these embodiments without departing from the broader spirit and scope of the various embodiments. Also, for example, the various mobile devices described herein may not necessarily be inside a vehicle. Further, for example, the various devices and modules described herein may be enabled and operated using hardware circuitry, firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., computer devices), and may be performed in any order (e.g., including means for achieving the various operations). Accordingly, the specification and the drawings are regarded in an illustrative rather than a restrictive sense.

What is claimed is:

1. A mobile communication system comprising:
a network listener base station associated with a vehicle configured to scan an environment within the mobile communication system, the network listener base station including a first antenna associated therewith;
a second base station associated with the vehicle, the second base station having a second antenna associated therewith to generate a signal that is stronger than a wireless signal of a cell site associated with a wireless service to a mobile device within the vehicle, the generation of the stronger signal of the second antenna being controlled through the network listener base station, and the coverage area of the first antenna being inclusive of the controlled area associated with the second antenna; and
a base station controller to identify the mobile device when the mobile device is within the controlled area based on an identification data associated therewith, to determine that the mobile device is within the controlled area based on the detection of the mobile device through the second antenna, and to gain control of an access of wireless communication associated with the mobile device based on the identification data when the mobile device is within the controlled area through the generation of the stronger signal of the second antenna.

2. The system of claim 1, wherein the base station controller further comprises a memory associated therewith, and wherein the base station controller is configured to one of permit and deny at least some portion of the wireless communication to the mobile device based on a profile data associated with the mobile device stored in the memory.

3. The system of claim 1, wherein the identification data of the mobile device is one of an International Mobile Subscriber Identity (IMSI) number and an International Mobile Station Equipment Identity (IMEI) number.

4. The system of claim 1, wherein the second base station includes at least one other antenna such that a controlled area associated with the second base station includes a coverage area of the at least one other antenna, along with a coverage area of the second antenna.

5. A method comprising:
identifying, through a base station controller, a mobile device in a vehicle when the mobile device is within a controlled area associated with an antenna of a base station associated with the base station controller based on an identification data of the mobile device;
determining that the mobile device is inside the controlled area based on a detection thereof through the antenna;
generating, through the antenna of the base station, a signal that is stronger than a wireless signal of a cell site associated with a wireless service to the mobile device, the generation of the stronger signal of the antenna of the base station being controlled through a network listener base station; and
gaining, through the base station controller, control of an access of wireless communication associated with the mobile device based on the identification data when the mobile device is within the controlled area, the control being gained through the generation of the stronger signal through the antenna of the base station.

6. The method of claim 5, wherein the identification data of the mobile device is one of an IMSI number and an IMEI number.

7. The method of claim 5, wherein gaining control of the access of wireless communication associated with the mobile device includes:
storing a profile data associated with the mobile device in a memory associated with the base station controller; and
one of permitting and denying at least some portion of the wireless communication to the mobile device based on the stored profile data.

8. The method of claim 5, wherein the base station includes at least one other antenna such that a controlled area associated with the base station includes a coverage area of the at least one other antenna, along with a coverage area of the antenna.

9. The method of claim 5, wherein the network listener base station includes an antenna whose coverage area includes the controlled area associated with the antenna of the base station.

10. The method of claim 7, further comprising:
maintaining a whitelist associated with a user data of the mobile device in the memory to appropriately one of permit and deny the at least some portion of the wireless communication to the mobile device.

11. The method of claim 7, further comprising:
permitting, through the base station controller, a delivery of an advertising message to the mobile device based on a location thereof inside the controlled area and a demographic data of a user thereof, wherein the advertising message is one of a Short Message Service (SMS) message and a Multimedia Message Service (MMS) message, and wherein the demographic data of the user of the mobile device is determinable from the memory associated with the base station controller based on the identity of the mobile device.

12. The method of claim 7, further comprising providing at least a portion of the stored profile data to be accessible through a mobile network operator associated with the wireless service to the mobile device.

13. The method of claim 10, wherein the whitelist is one of stored in a database associated with the base station controller and hardcoded in a virtual base station associated with the base station.

14. The method of claim 12, wherein providing at least the portion of the stored profile data to be accessible through the mobile network operator includes:
  permitting access of at least the portion of the stored profile data such that a disablement of the wireless service of the mobile device is actionable through the mobile network operator when the mobile device is within the controlled area.

15. A method comprising:
  storing a profile data associated with a mobile device within a vehicle in a memory associated with a base station controller;
  identifying, through the base station controller, the mobile device when the mobile device is within a controlled area associated with an antenna of a base station associated with the base station controller based on the stored profile data;
  determining that the mobile device is inside the controlled area based on a detection thereof through the antenna;
  generating, through the antenna of the base station, a signal that is stronger than a wireless signal of a cell site associated with a wireless service to the mobile device to enable the base station controller gain control of the wireless service to the mobile device when the mobile device is within the controlled area, the generation of the stronger signal of the antenna of the base station being controlled through a network listener base station; and
  one of permitting and denying at least a portion of the wireless service to the mobile device through the base station controller upon the base station controller gaining control of the mobile device.

16. The method of claim 15, wherein the identity of the mobile device is one of an IMSI number and an IMEI number.

17. The method of claim 15, further comprising providing at least a portion of the stored profile data to be accessible through a mobile network operator associated with the wireless service to the mobile device.

18. The method of claim 15, wherein the base station includes at least one other antenna such that a controlled area associated with the base station includes a coverage area of the at least one other antenna, along with a coverage area of the antenna.

19. The method of claim 15, wherein the network listener base station includes an antenna whose coverage area includes the controlled area associated with the antenna of the base station.

20. The method of claim 17, wherein providing at least the portion of the stored profile data to be accessible through the mobile network operator includes:
  permitting access of at least the portion of the stored profile data such that a disablement of the wireless service of the mobile device is actionable through the mobile network operator when the mobile device is within the controlled area.

* * * * *